United States Patent [19]

Sademaa

[11] Patent Number: 5,978,859
[45] Date of Patent: Nov. 2, 1999

[54] IMPLEMENTATION OF TIMING BETWEEN A MICROPROCESSOR AND ITS PERIPHERAL DEVICES

[75] Inventor: Juhani Sademaa, Klaukkala, Finland

[73] Assignee: Nokia Telecommunications Oy, Espoo, Finland

[21] Appl. No.: 08/809,484

[22] PCT Filed: Sep. 14, 1995

[86] PCT No.: PCT/FI95/00501

§ 371 Date: May 13, 1997

§ 102(e) Date: May 13, 1997

[87] PCT Pub. No.: WO96/08771

PCT Pub. Date: Mar. 21, 1996

[30] Foreign Application Priority Data

Sep. 15, 1994 [FI] Finland ................................ 944282

[51] Int. Cl.⁶ .................................................. G06F 3/00
[52] U.S. Cl. .................................................. 710/3; 713/400
[58] Field of Search .......................... 395/823; 340/172.5; 364/900; 179/89; 710/1, 3, 25, 129; 713/400, 401, 500

[56] References Cited

U.S. PATENT DOCUMENTS

| | | | |
|---|---|---|---|
| 3,973,244 | 8/1976 | Lovercheck et al. | 340/172.5 |
| 4,303,990 | 12/1981 | Seipp | 364/900 |
| 4,440,986 | 4/1984 | Thorson | 179/2 |
| 4,547,630 | 10/1985 | Giammarrusco | 179/89 |
| 5,222,226 | 6/1993 | Yamaguchi et al. | 395/425 |

FOREIGN PATENT DOCUMENTS

| | | |
|---|---|---|
| 092 976 | 11/1983 | European Pat. Off. . |
| 78 21446 | 2/1980 | France . |
| 2 045 623 | 4/1972 | Germany . |

OTHER PUBLICATIONS

Anderson et al: "Two–Speed Control Storage", IBM Technical Disclosure Bulletin, vol. 22, No. 10, Mar. 1980, pp. 4690–4691.

*Primary Examiner*—Joseph E. Palys
*Assistant Examiner*—Omar A. Omar
*Attorney, Agent, or Firm*—Pillsbury Madison & Sutro LLP

[57] ABSTRACT

A method and a circuit arrangement for implementing timing between a microprocessor and its peripheral devices. An address bus and a data bus connect the microprocessor to the peripheral devices to transfer data from the microprocessor to a selected peripheral device, corresponding to writing to the peripheral device, and from a selected peripheral device to the microprocessor, corresponding to reading from the peripheral device. The method comprises generating to the peripheral devices (a) a signal controlling reading (Output Enable), which enables a peripheral device to apply data to the data bus, and (b) a signal controlling writing (Write Enable), which enables data to be written from the data bus to a peripheral device. In order to simplify the equipment and circuit design, at least the signal (GWE) controlling writing is generated by means of an address decoder from the address currently valid on the address bus in such a manner that the moments of the rising and/or falling edges of the signal are dependent on the value of the address and at the same time independent, within the addressing cycle relating to the peripheral device, of the timing determined by the microprocessor, whereby the assertion period of the signal can be adjusted by means of the value of the address.

7 Claims, 6 Drawing Sheets

IMPLEMENTATION OF TIMING BETWEEN A MICROPROCESSOR AND ITS PERIPHERAL DEVICES

This application is the national phase of international application PCT/FI95/00501 filed Sep. 14, 1995 which designated the U.S.

BACKGROUND OF THE INVENTION

1. Field of the Invention

The present invention relates to a microprocessor environment, wherein a plurality of peripheral devices are connected to a microprocessor (CPU), the microprocessor writing data to and reading data from the peripheral devices. To be more specific, the present invention relates to a method circuit arrangement for implementing timing between a microprocessor and its peripheral devices.

2. Description of the Related Art

FIG. 1 shows a hardware environment as described above, wherein four different (having different speeds) peripheral devices A . . . D are connected to a microprocessor 10 by means of its data bus 11 and address bus 12 in a manner known per se. (It should be noted that in the figures presented below, the signal lines are connected to one another only at those points which are indicated by small circles). In this exemplifying case, the peripheral device A is a medium-speed (one wait state) EPROM, the peripheral device B is a high-speed (no wait states) SRAM (Static Random Access Memory), the peripheral device C is a low-speed (two wait states) peripheral device, and the peripheral device D is a very low-speed (three wait states) peripheral device. It is also assumed that the address hold time of the peripheral device C is two clock cycles, and that the address hold time of the peripheral device D is three clock cycles. (Address hold time will be defined below). The peripheral devices C and D may be for instance serial input-output controllers or A/D converters.

The wait state mentioned above, which represents the speed of a peripheral device, means that a microprocessor extends the assertion period of signals according to the assertion of a corresponding control signal (if the control signal is not asserted, the microprocessor operates as quickly as it is able to). The control signal is usually referred to as a WAIT signal, and in this exemplifying case, this signal is generated in a decoder 13, wherefrom it is applied to the microprocessor. (In some processors, for instance in processors manufactured by Motorola, a corresponding function is implemented with a signal referred to as ACKNOWLEDGE). In the manner described above, it is thus possible to adjust a microprocessor to wait for slower peripheral devices.

The signals used in FIG. 1 have the meanings represented in the following table. The reference of a signal is formed from its generally used English "name", which is shown in brackets after the reference.

| Signal | Definition |
| --- | --- |
| OE (Output Enable) | Opens the data bus buffer of a peripheral device in order for the peripheral device to be able to feed data to the data bus |
| WE (Write Enable) | A signal which enables data to be written to a peripheral device |
| CE (Chip Enable) | A peripheral device selection signal by which one peripheral device at a time is selected to be active |

In addition, FIG. 1 shows a clock signal CLK and a WAIT signal, and a control signal STB, the meaning of which will be explained below.

Signals OE are occasionally also referred to by an alternative abbreviation RD (i.e. Read; the microprocessor reads from a peripheral device), and signals WE, correspondingly, by an abbreviation WR (i.e. Write; the microprocessor writes to a peripheral device). When a signal WE is valid, desired data must appear in the inputs of the input register of the peripheral device, and when the signal WE is negated, the desired data remains in the peripheral device (i.e. the new data visible in the inputs is no longer able to be written to the peripheral device).

Selection signals CE are typically generated by combination logic in the decoder 13 from the address appearing over the address bus 11, i.e. the signals CE are activated according to the address appearing over the address bus. A certain address range thus corresponds to each peripheral device in such a manner that when the address is located in this range, a corresponding selection signal CEn (n=1, 2, 3 or 4, depending on which peripheral device is concerned) is active.

Whether it is necessary to generate selection signals CE at all depends on the type of the peripheral device. For instance in peripheral devices wherein only one register is provided, such registers being for instance LED control registers, mere OE and WE signals are required.

When selection signals CEn are used (as is done in the exemplifying case of FIG. 1), the OE and WE signals generated by the microprocessor 10 are applied directly to input pins of the peripheral devices A . . . D corresponding to them.

In the known solution described above, the timing of read and write signals (timing refers to the occurring moments of the rising and/or falling edges of signals, i.e. to the duration of pulses) can be changed only by means of the waiting procedure described above, i.e. by extending the duration of pulses by a certain number of clock cycles by means of control carried out by a WAIT signal.

In the environment described above, it is sometimes problematic as to how the timing requirements of a peripheral device are adapted to those of the microprocessor. This applies especially to writing performed to the peripheral device, since writing takes place on the terms of the peripheral device. As for reading, it is not usually problematic, since it takes place on the terms of the microprocessor. A peripheral device may for instance require a very long address hold time. An address hold time is illustrated in FIG. 2, which shows an address signal ADDR appearing over the bus 12 and a signal WE controlling writing. An address hold time is the time T for which the address ADDR must be active even after the signal WE has been negated (a signal is valid when it is in a logical "0" state). In FIG. 2, a reference symbol ti indicates the moment at which the signal WE is negated, and a reference symbol t2 indicates the moment at which the address is deactivated. An address hold time is sometimes defined also in relation to a selection signal CE in the data books of circuit manufacturers. If hold time requirements are defined in relation to both signals (WE and CE), both requirements must naturally be fulfilled.

Different peripheral devices have different requirements as to how long the address hold time should at least be. These different requirements are due to structural differences between peripheral devices (for instance signal transmission time differences within a peripheral device). A long address hold time cannot however be implemented with the wait state solution described above, because the difference between the moments t1 and t2 generated by the microprocessor will be fixed (constant) in any case.

The problem described above is solved in the known solutions (FIG. 1 is further referred to) by arranging a latch circuit 14 between the microprocessor and a peripheral circuit, and applying the address signal ADDR to the latch circuit. In practice, the latch circuit is a register in which the address is stored until a new address value is applied to the register by means of a separate control signal STB. The control signal is formed from the selection signals CE3 and CE4 of the peripheral devices concerned (in this example, n=3 and n=4, corresponding to the "slow" peripheral devices C and D), which selection signals are connected to the inputs of an AND gate 15. The control signal STB is obtained from the output of the AND gate 15, the control signal being in a logical "0" state when at least one of the selection signals is in a logical "0" state (i.e. is valid). The signal STB thus determines the moment at which the new address value is stored in the circuit 14, whereby the signal can be used for extending the period for which the address is valid with respect to the peripheral device. In other words, it is a way of extending the address hold time.

However, incorporating a latch circuit and the control required for it in a circuit board renders the practical solution more complicated and thus more expensive. The solution increases especially the number of signal conductors required on the circuit board, which makes circuit board design more difficult.

BRIEF SUMMARY OF THE INVENTION

The object of the present invention is to obviate the disadvantages mentioned above and to provide a solution by means of which the timing requirements of the peripheral devices can be fulfilled by a simpler circuit solution.

The invention generates a signal in the address decoder, the signal controlling at least writing, in such a manner that the timing of the signal (i.e. the rising and falling moments of pulses) is dependent on the address located over the data bus, and is at the same time, within the address cycle relating to the peripheral device, independent of the timing determined by the microprocessor. A signal controlling reading can also be generated in a corresponding manner, even though this is not as useful, since writing is usually a more problematic event with respect to timing requirements.

Due to the solution of the invention, the timing requirements of peripheral devices can be implemented without the latch circuit described above, whereby control circuits required by it and for instance wirings from the latch circuit to the peripheral devices are not needed. This simplification can thus also be seen in the simplification of circuit board design.

In the following, the invention and its preferred embodiments will be described in more detail with reference to FIGS. 3–7d in the examples according to the appended drawings, in which

DESCRIPTION OF THE PREFERRED EMBODIMENTS

Figure 2:
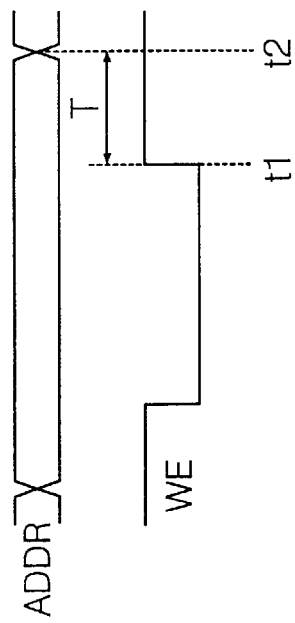
FIG. 2 illustrates an address hold time required by a peripheral device.
Figure 1:
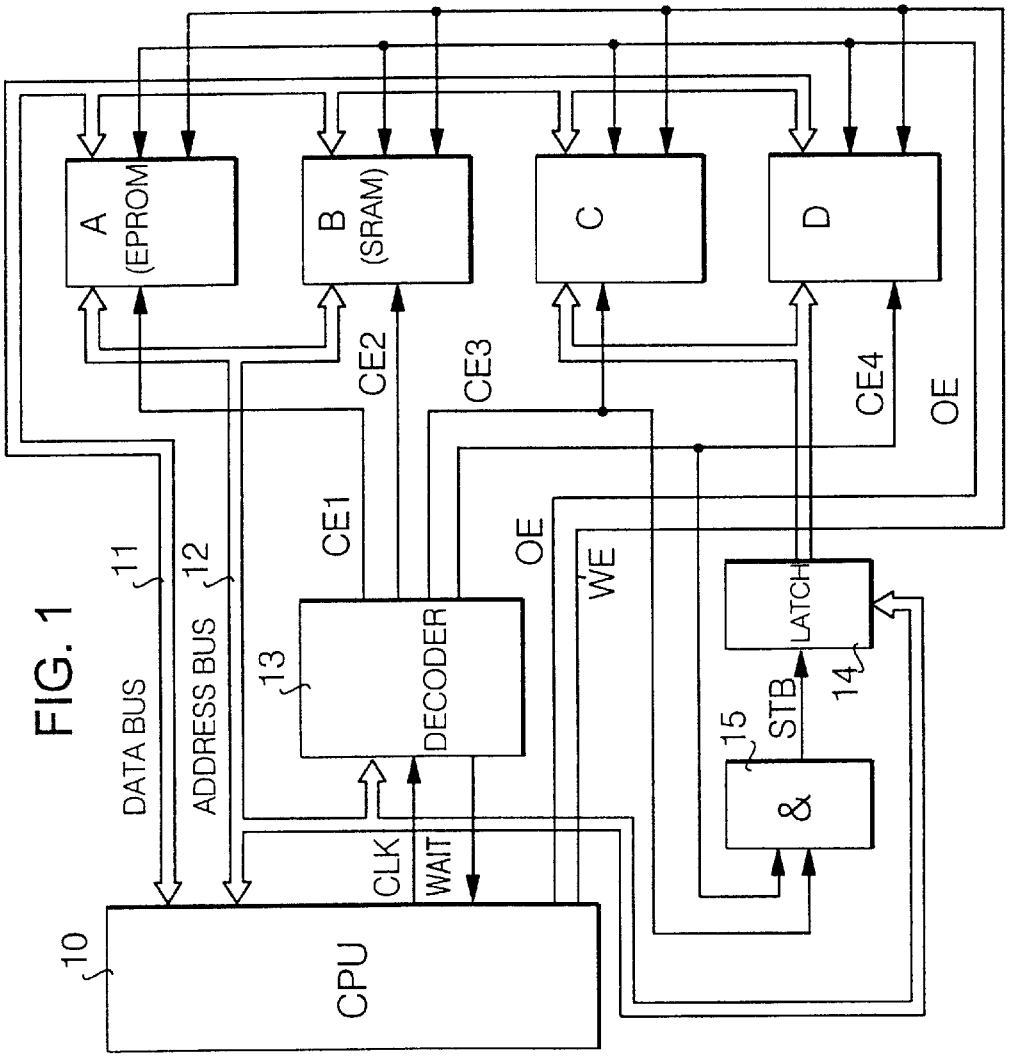
FIG. 1 shows a known solution for implementing timing requirements between a microprocessor and its peripheral devices.
Figure 3:
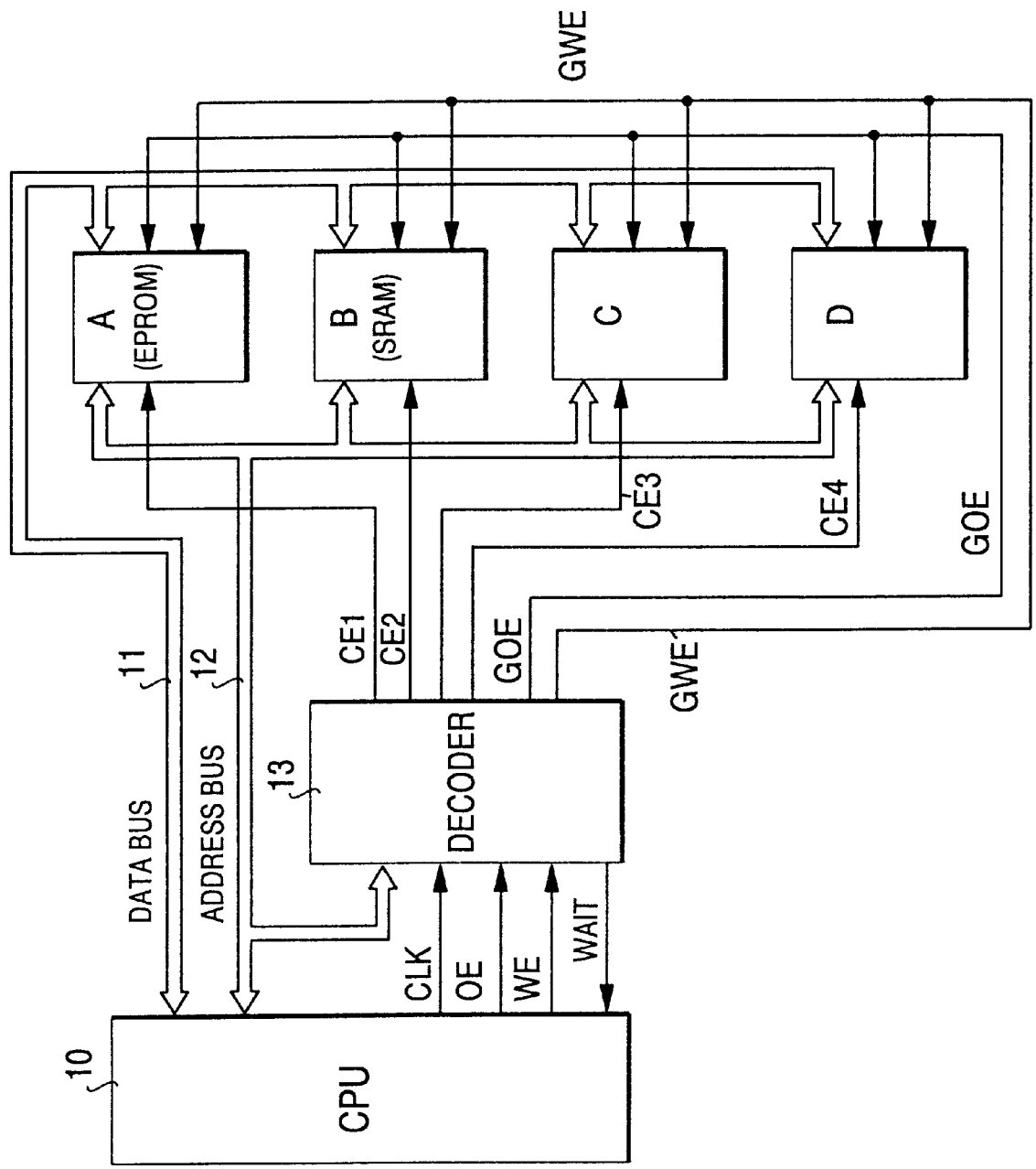
FIG. 3 shows the solution of the invention for implementing timing requirements between a microprocessor and its peripheral devices.

FIG. 3 shows the solution according to the invention for solving the timing problems described above in a simpler manner. The same components are indicated by the same reference numerals as in FIG. 1.

In the circuit according to FIG. 3, the global signals controlling writing and reading, GWE and GOE, are generated in the address decoder 13 ("global" refers to the fact that the signals are applied to all peripheral devices or at least to the majority of them), and the timing of these signals (i.e. the moments at which said signals are asserted and the moments at which said signals are negated) is determined according to the address range in which the address located over the address bus is currently situated. Thus, when the address is situated in a certain predetermined range, the timing of GWE and GOE signals follows a certain predetermined timing (which is restricted to this range). (It should be noted that only that peripheral device to which the selection signal CEn corresponding to which is valid is active and uses the signals). By binding the timing of signals controlling writing and reading to a valid address (i.e. to a peripheral device) it is possible to solve the specific timing needs, such as the address hold time requirement described above, required by each peripheral device.

Figure 4A:
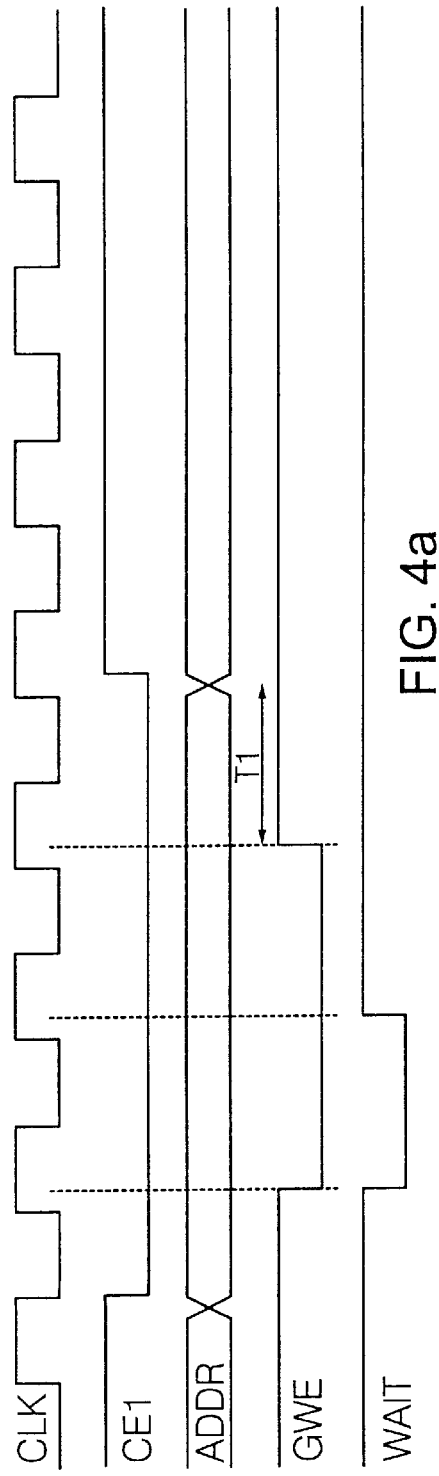
FIG. 4a is a timing diagram illustrating signals appearing in the hardware environment according to FIG. 3 as regards a fast peripheral device A.
Figure 4B:
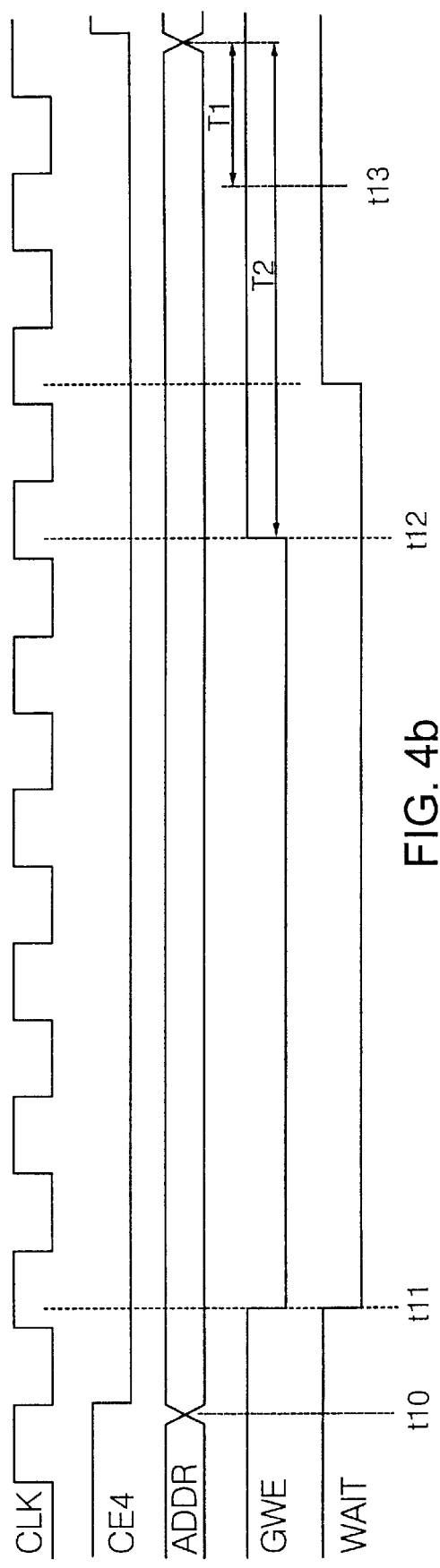
FIG. 4b is a timing diagram illustrating signals appearing in the hardware environment according to FIG. 3 as regards a slow peripheral device D.

FIGS. 4a and 4b illustrate timing as regards a fast peripheral device A (SRAM) and a slow peripheral device D, respectively. In addressing the peripheral device A (FIG. 4a), the microprocessor operates at the highest possible speed, the address hold time characteristic of the microprocessor being indicated by a reference T1. The microprocessor would generate an address hold time of this length irrespective of how long the WAIT signal is active, if the solution according to prior art were used (cf. FIG. 1). If prior art were used in addressing the peripheral device D, the signal controlling writing would thus be valid for a considerably longer time. The moment at which the signal would be negated is indicated by a reference t13 in FIG. 4b. Since the signal controlling writing (GWE) is generated dependently on the address in the decoder 13 in the present invention, however, the address hold time T2 can be significantly extended. The procedure to be followed is thus as follows.

When the address becomes valid at a moment t10, the decoder detects this at the next leading edge of the clock signal CLK, whereby the state counter of the decoder is started, and the signal GWE changes its state (is asserted) at a moment tll. After this, the state counter counts a number of clock cycles (5 clock cycles in this exemplifying case), the number being dependent on the address (i.e. also on the peripheral device), and then negates the signal GWE (moment t12). If the address were some other address, the state counter could count for instance four or six clock cycles instead of five before negating the signal GWE.

FIGS. 4a and 4b illustrate the idea of the invention only by means of a signal GWE controlling writing, since the idea of the invention is primarily applied to this signal.

In the following, a way of implementing the decoder will be described in detail by describing first a known decoder implementation so that the differences of the invention over the prior art would be better described.

Figure 5:
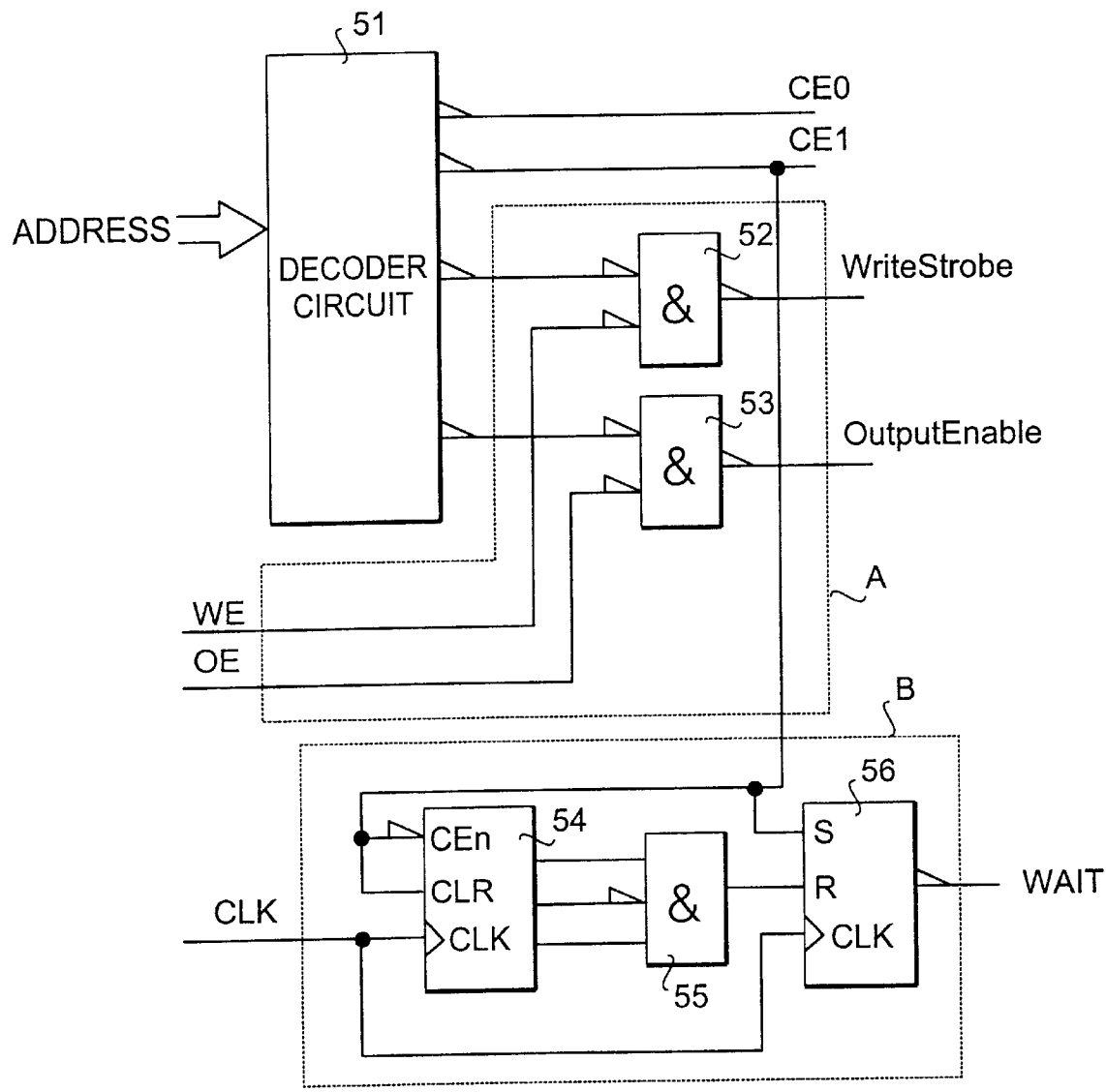
FIG. 5 shows a conventional decoder structure.

FIG. 5 shows a known decoder structure wherein two selection signals CE0 and CE1, a WAIT signal, and also a write signal WriteStrobe and a read signal OutputEnable are generated. The write signal WriteStrobe is a signal for controlling writing that is active only in a certain address range. As for the read signal OutputEnable, it is a signal for controlling reading which is active only in a certain address range. The signal WriteStrobe is generated by applying one output signal of a decoder circuit 51 and a WE signal generated by a microprocessor to the (inverting) inputs of a first AND gate 52. The signal OutputEnable is generated by applying a second output signal of the decoder circuit 51 and an OE signal generated by the microprocessor to the (inverting) inputs of a second AND gate 53. In the decoder 13 shown in FIG. 1, the part in which WriteStrobe and OutputEnable signals are generated is not needed, the part being indicated by a reference A, but the decoder generating these signals is shown in order to be able to illustrate better the difference of the present invention over the prior art. According to the prior art, it is thus possible to generate write and read signals WriteStrobe and OutputEnable which are active only in a certain address range. The timing of these signals is however not dependent on the valid address, and these signals are not used globally, but they are peripheral device-specific (memory area-specific).

The decoder circuit 51 is a combination logic circuit wherein each output is formed from inputs by means of combination logic. The circuit may be for instance of type 74138, even though all the components of FIG. 5 can be integrated into a single programmable logic device (PLD).

In the circuit of FIG. 5, the WAIT signal is generated in the part indicated by a reference B, by which signal the length of a memory cycle relating to a selection signal CEn is adjusted (in a manner known per se). The selection signal (CE1 in this case) is applied to the (inverting) Count Enable input CEn and to the reset input CLR (Clear) of a three-bit binary counter 54. The outputs of the counter are connected to the inputs of an AND gate 55 (the middle one of which is inverting), and the output of the AND gate is connected to the R input of an SR flip-flop 56. The selection signal CE1 is connected to the S input of the flip-flop. The WAIT signal is obtained from the (inverting) output of the flip-flop. The clock signal CLK is connected to the clock inputs CLK of the counter 54 and the SR flip-flop.

Figure 6:
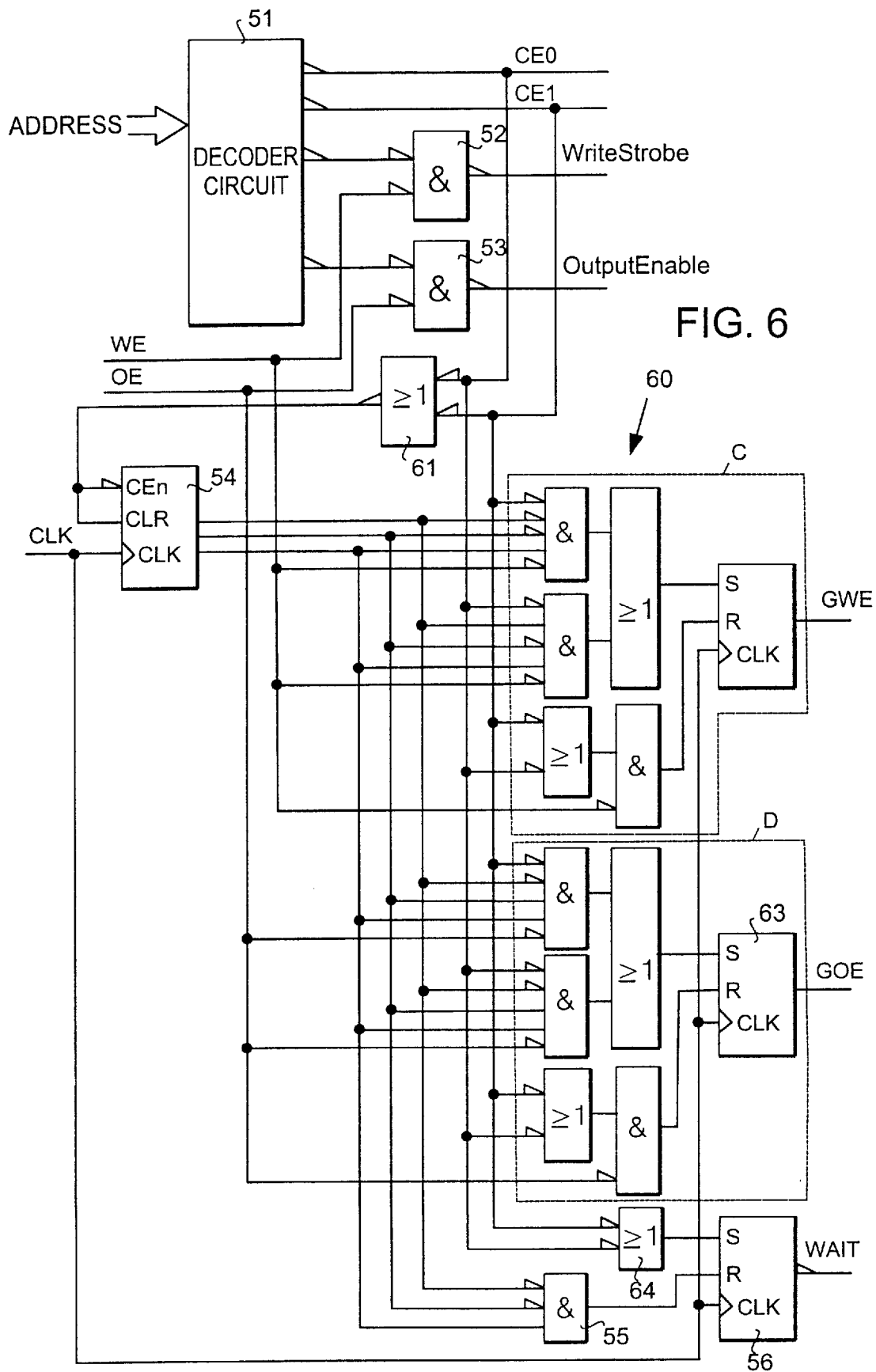
FIG. 6 shows a decoder structure of the invention.

The known basic structure described above is utilized in the decoder of the invention shown in FIG. 6. The components corresponding to one another have therefore been indicated by the same reference numerals as in FIG. 5. In this case, both of the selection signals are applied to the (inverting) inputs of an OR gate 61, and an input signal to a binary three condition counter is obtained from the (inverting) output of the OR gate in the manner shown in FIG. 5. The selection signals (CE0 and CE1) and the control signals (WE and OE) generated by the microprocessor are also applied to a combination logic part in a block 60, which comprises two logic parts C and D corresponding to each other and an OR gate 64. It should be noted that in this case, the control signals WE and OE generated by the microprocessor are not used for timing in any way, but they are used for only detecting whether a write or read event is concerned (i.e. whether it is necessary to generate a signal controlling writing or reading). Independence from timing determined by a microprocessor is thus achieved by the fact that such signals the timing of which is, within the addressing cycle relating to a peripheral device, dependent on the timing determined by the microprocessor are not used in generating the significant moments of GWE or GOE signals.

In part C is generated the global signal according to the invention for controlling writing, the signal indicated by a reference GWE in this case (as distinct from the signal WE generated by the microprocessor). In the part D, correspondingly, the global signal GOE according to the invention controlling reading is generated. The logic part C comprises (a) a first AND gate, to the inputs of which are applied the output signals of the counter 54 (the first two inputs are inverting), the selection signal CE1 (an inverting input) and the WE signal generated by the microprocessor (an inverting input), (b) a second AND gate, to the inputs of which are applied the output signals of the counter 54 (the middle one of said inputs is inverting), the selection signal CE0 (an inverting input), and the WE signal generated by the microprocessor (an inverting input), (c) a first OR gate, to the (inverting) inputs of which are applied the selection signals, (d) a second OR gate, to the inputs of which are connected the outputs of the first and the second AND gate, (e) a third AND gate, to the inputs of which are applied the output of the first OR gate and the control signal WE (an inverting input), and (f) a flip-flop SR, to the S input of which is connected the output of the second OR gate and to the R input of which is connected the output of the third AND gate. The part D has a corresponding configuration, but the signal WE is replaced with a signal OE. (In addition, that input of the first AND gate which corresponds to the middle bit of the counter is non-inverting in the case of the block D, and that input of the second AND gate to which the first bit of the counter is applied is inverting and that input to which the second bit of the counter is applied is non-inverting).

The selection signals are applied to the (inverting) inputs of the OR gate 64, and the output of the OR gate is connected to the S input of the SR flip-flop 56. The output of the AND gate 55 is connected to the R input of the SR flip-flop 56 in the same manner as in the known solution (FIG. 5) to generate a WAIT signal to the (inverting) output of the SR flip-flop.

The selection signals CE0 and CE1 are thus formed first from the address located over the bus, after which S and R signals are generated from said selection signals and the output signal of the counter 54 by means of the combination logic according to the figure, the rising and falling edges of the signals GWE and GOE being generated by means of the S and R signals in the SR flip-flops.

Figure 7A:
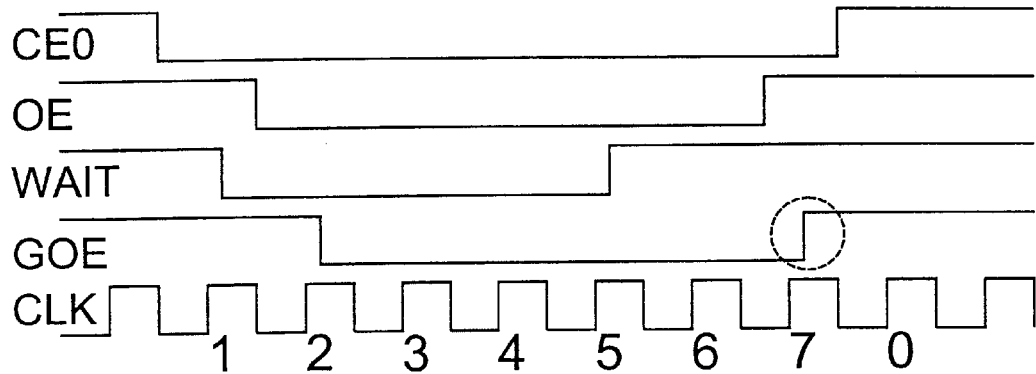
FIGS. 7a–7d show write and read cycles corresponding to selection signals generated by the decoder according to FIG. 6.
Figure 7B:
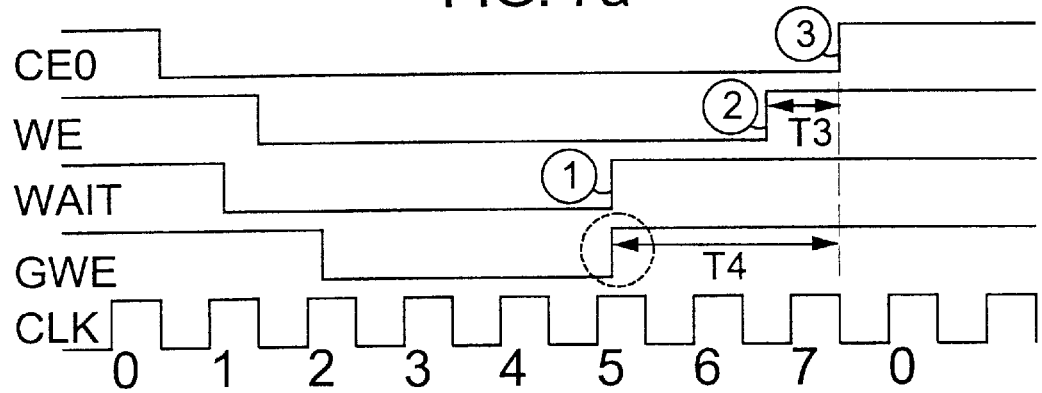
Figure 7C:
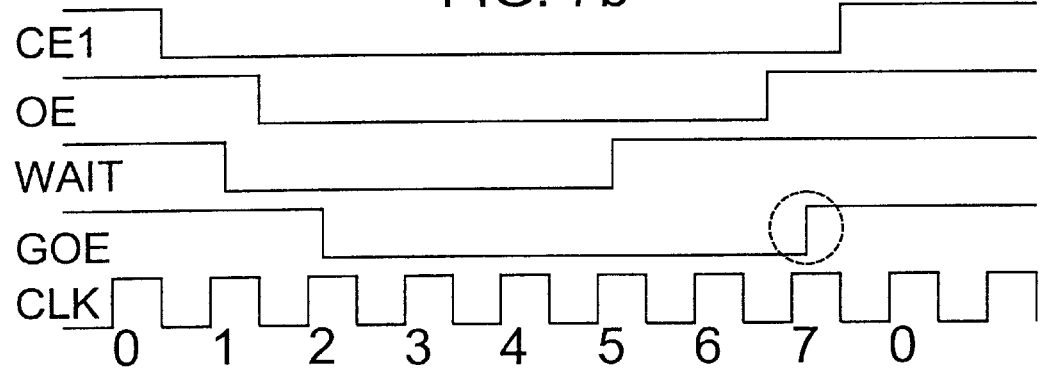
Figure 7D:
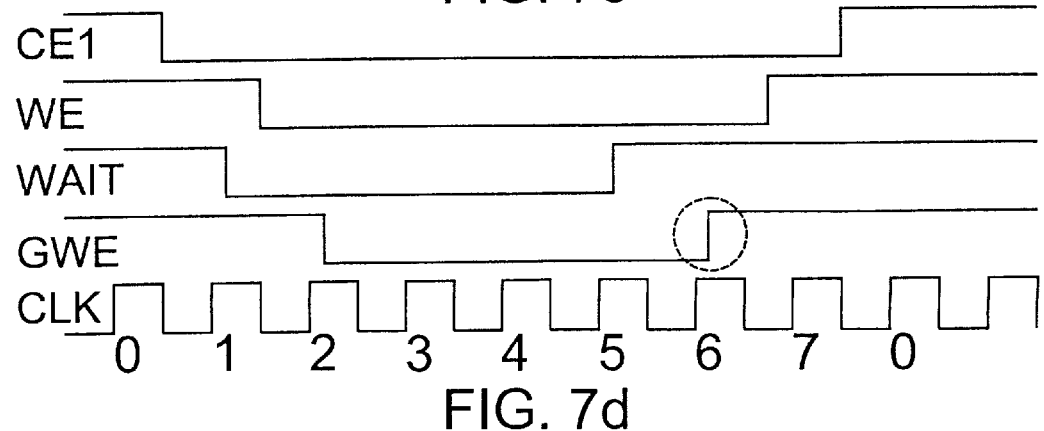

FIGS. 7a–7d illustrate writing and reading cycles corresponding to the selection signals of the decoder of FIG. 6. The events represented in the figures are alternative, because writing and reading events cannot take place simultaneously. FIGS. 7a and 7b show the reading and writing events relating to the selection signal CE0, and FIGS. 7c and 7d show correspondingly the reading and writing events relating to the selection signal CE1. The pulse of the signal OE (FIG. 7a) generated by the microprocessor 10 has a fixed duration, and in addition to this, an application-specific signal GOE controlling reading has been generated according to the invention, the timing of said signal being adjustable with respect to the signal OE, i.e. the assertion period of the signal GOE can be adjusted to begin and end with an accuracy of one clock cycle in an arbitrary location. In this exemplifying case, the period begins after the second clock pulse and ends after the seventh clock pulse. FIG. 7b shows correspondingly an application-specific signal GWE controlling writing, the assertion period of which begins after the second clock pulse and ends after the fifth clock pulse. Since the address ADDR is valid simultaneously with the selection signal, the time period T3 (i.e. the address hold time), for instance, may in some cases be too short as regards the peripheral device. The hold time can now be extended by generating a global signal GWE controlling writing, the assertion period of which signal can be adjusted, depending on the address, to begin and end with an accuracy of one clock cycle in an arbitrary location. By means of a WAIT signal, the events are extended in such a manner that the signal WE is valid for a sufficiently long time and that there will be sufficient hold time even after that. The rising edges indicated by circled numerals 1–3 are interconnected in time domain; the waiting signal WAIT is applied to the microprocessor, as a result of which the microprocessor negates the signal WE (the moment corresponding to the circled numeral two) after a certain constant time (1.5 clock cycles in this example), and after that it also negates the selection signal after a certain second constant time (the moment corresponding to the circled numeral three) . If the transient moment of the waiting signal is delayed, the edges of the other mentioned signals are delayed correspondingly.

FIGS. 7c and 7d show the corresponding events as regards the selection signal CE1. The essential point is thus that the transient moments of the signals GOE and GWE are dependent on the address. These transient moments are also, within the addressing cycle relating to a peripheral device, independent of the timing determined by the microprocessor (which timing is based on control signals, the location of which on the time axis is "fixed", cf. the time instants indicated by the circled numerals 1–3 in FIG. 7b). An addressing cycle refers to the cycle for which a certain address (which addresses a peripheral device) is valid. The addressing cycle relating to a certain peripheral device thus ends when the address is negated, also if the next asserted address is directed to the same peripheral device.

As a summary of FIGS. 6 and 7a–7d, the following can be stated. The signal GWE is asserted after one of the selection signals is asserted and after the signal WE is asserted. The signal GWE is negated when the selection signal is active and when the counter 54 reaches its predetermined value (4 or 5 in this example). The signal GOE is asserted after either of the selection signals is asserted and when the signal OE is asserted. The signal GOE is negated when the selection signal is active and when the counter 54 reaches its predetermined value (6). The WAIT signal is asserted after either of the selection signals is asserted and is negated when the counter has reached a predetermined value (4). The counter 54 remains zeroed (the output value is zero) when neither of the selection signals is in a logical "0" state, and counting is allowed when one of the selection signals is asserted (in a logical "0" state).

Even though the invention has been described above with reference to the examples according to the accompanying drawings, it will be apparent that the invention is not so restricted, but it can be modified within the scope of the inventive concept disclosed above and in the appended claims. Thus, even though the problem existing in the background of the invention is illustrated above by using the address hold time required by a peripheral device as an example, it will be apparent that the invention can be used in a corresponding manner for adapting the timing to correspond to the requirements relating to also other parameters of the peripheral device. The detailed circuitry by which the timing of the signals is made dependent on the address may also vary in various ways. It is also possible to generate the signals with their own decoder from the address, but for the sake of simplicity it is preferable to use the same circuit for generation by which the selection signals are generated.

What is claimed:

1. A method for implementing a timing between a microprocessor and peripheral devices of a microprocessor system;

peripheral devices having individual timing requirements, and said microprocessor being interconnected with the peripheral devices;

the microprocessor system having
an address bus and a data bus for transferring data from the microprocessor to a selected one of said peripheral devices to thereby write to the selected peripheral device, and for transferring data from a selected one of the peripheral devices to the microprocessor to thereby read from the selected peripheral device, the address appearing on the address bus addressing the selected peripheral device; and
a circuit arrangement for implementing timing between the microprocessor and the peripheral devices, said circuit arrangement comprising means
(a) for generating a reading control signal, which enables the selected peripheral device to apply data to the data bus, and
(b) for generating a writing control signal, which enables data to be written from the data us to the selected peripheral device, providing said address to the address bus, said address addressing the selected peripheral device, providing to the peripheral devices said reading control signal, which controls the reading of data from the selected peripheral device to the data bus, providing to the peripheral devices the writing control signal which controls the writing of data from the data bus to the selected peripheral device, the writing control signal being generated by means of an address decoder in response to the address currently valid on the address bus in such a manner that the timing of the rising and/or falling edges of said writing control signal is selected according to said address and is at the same time independent, within an addressing cycle of the selected peripheral device, of the timing determined by the microprocessor, in order to meet the timing requirements of the peripheral device designated by said address.

2. A method according to claim 1, comprising generating the reading control signal in such a manner that the timing of the rising and falling edges of the reading control signal is dependent on the address currently valid on the address bus, whereby they are also, within the addressing cycle relating to the peripheral device, independent of the timing determined by the microprocessor.

3. A method according to claim 2, further comprising performing the generation of the reading control signal by means of the same address decoder by which are also generated peripheral device selection signals, by which one peripheral device at a time is selected to be active.

4. A method according to claim 1, further comprising performing the generation of the writing control signal by means of the same address decoder by which are also generated peripheral device selection signals, by which one peripheral device at a time is selected to be active.

5. A microprocessor system, comprising:

a microprocessor, peripheral devices having individual timing requirements, said microprocessor being interconnected with said peripheral devices, an address bus and a data bus, for transferring data from the microprocessor to a selected one of said peripheral devices, to thereby write to the selected peripheral device, and for transferring data from a selected one of the peripheral devices to the microprocessor, to thereby read from the selected peripheral device, an address currently appearing on the address bus addressing the selected peripheral device, a circuit arrangement for implementing timing between the microprocessor and the peripheral devices, said circuit arrangement comprising means
 (a) for generating a reading control signal, which enables the selected peripheral device to apply data to the data bus, and
 (b) for generating a writing control signal, which enables data to be written from the data bus to the selected peripheral device, the writing control signal being generated by means of an address decoder in response to the address currently valid on the address bus in such a manner that the timing of the rising and/or falling edges of said writing control signal is selected according to said address and is at the same time independent, within an addressing cycle of the selected peripheral device, of the timing determined by the microprocessor, in order to meet the timing requirements of the peripheral device designated by said address.

6. A circuit arrangement according to claim 5, wherein said means for generating is responsive to the address appearing on the address bus in such a manner that the timing of the reading control signal is also dependent on said address.

7. A circuit arrangement according to claim 5, wherein said means for generating is provided in the same decoder in which are disposed means for generating the peripheral device selection signals, by which selection signals one peripheral device at a time is selected to be active.

* * * * *